Figure 1:
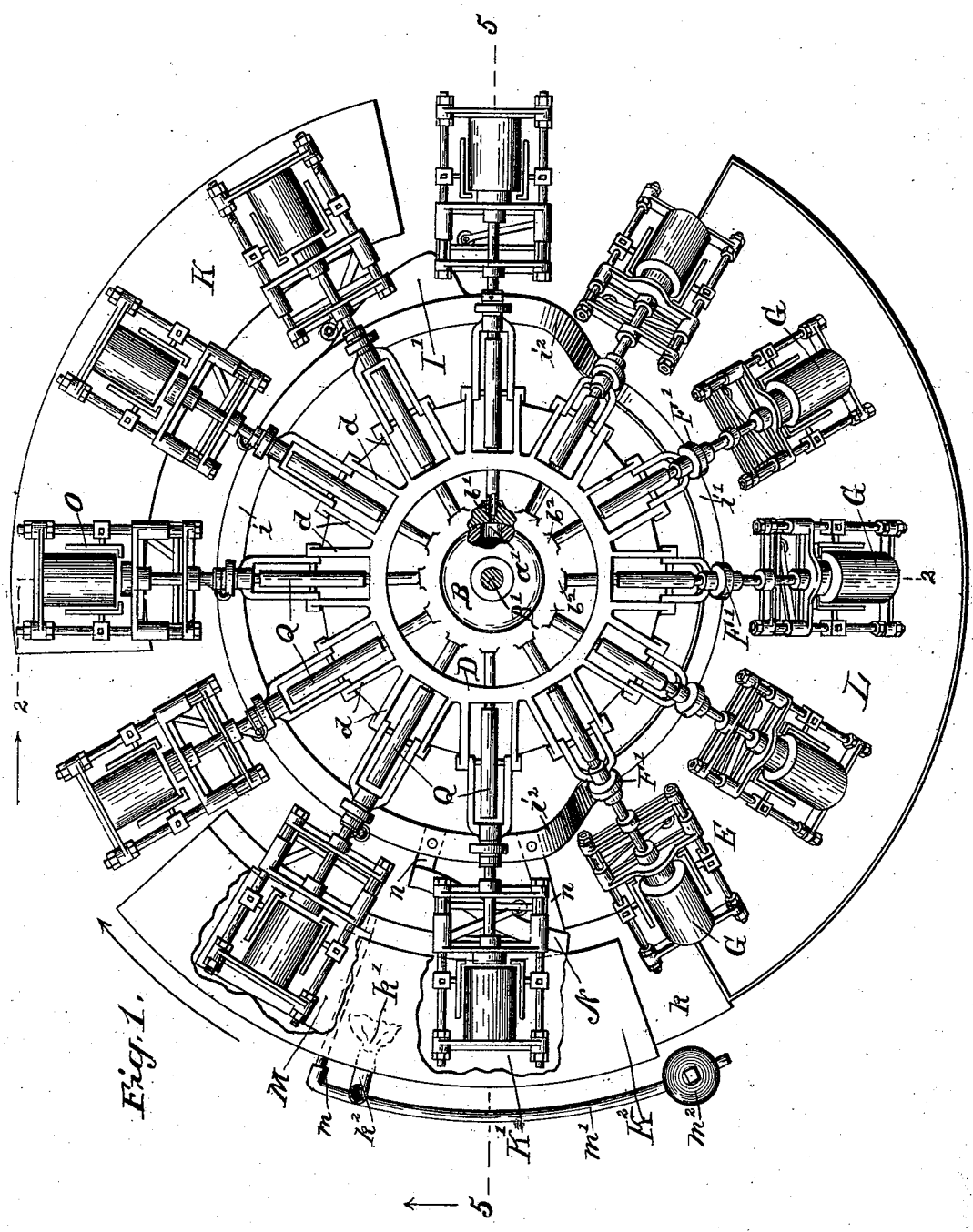

(No Model.) 3 Sheets—Sheet 1.

C. B. McDONALD.
CAN TESTING MACHINE.

No. 506,182. Patented Oct. 3, 1893.

Witnesses.
W. C. Colles
S. W. Brainard

Inventor.
Charles B. McDonald,
By Coburn & Thacher
Attys.

(No Model.)  3 Sheets—Sheet 2.
C. B. McDONALD.
CAN TESTING MACHINE.
No. 506,182.  Patented Oct. 3, 1893.
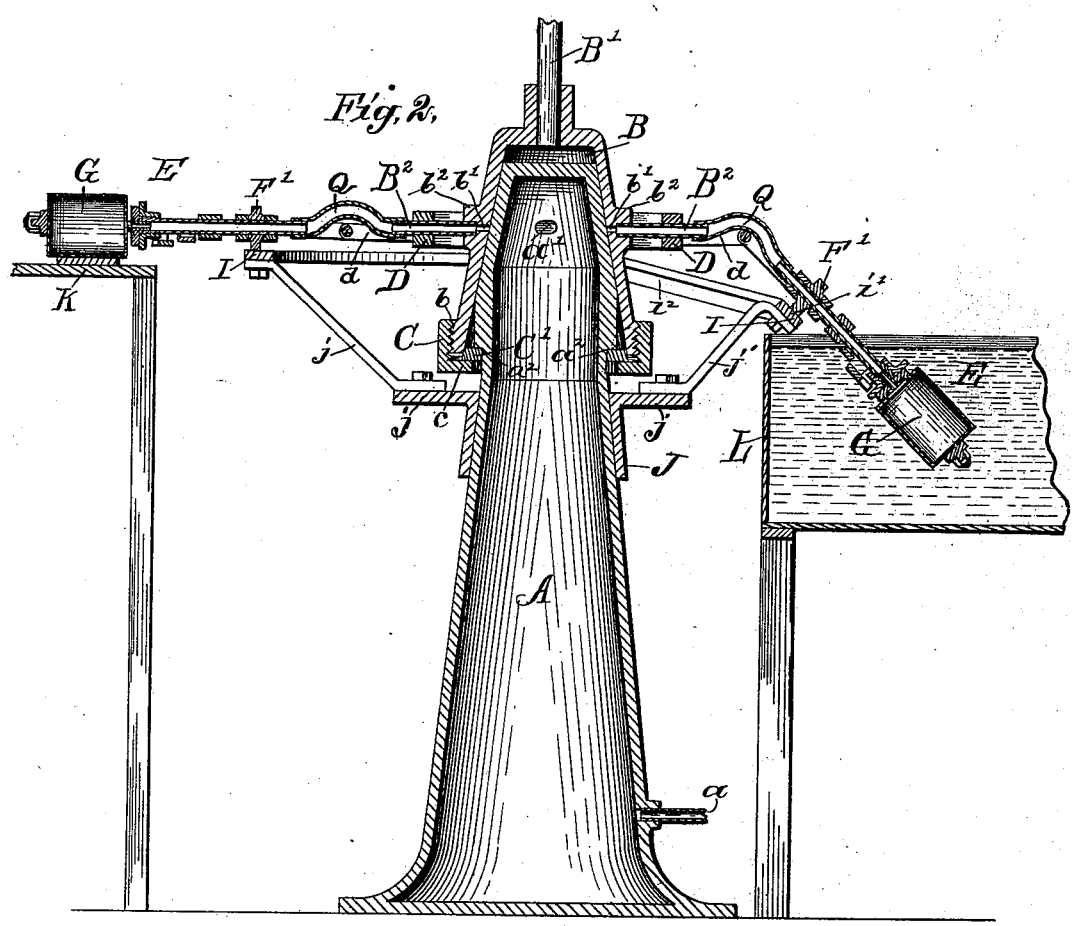
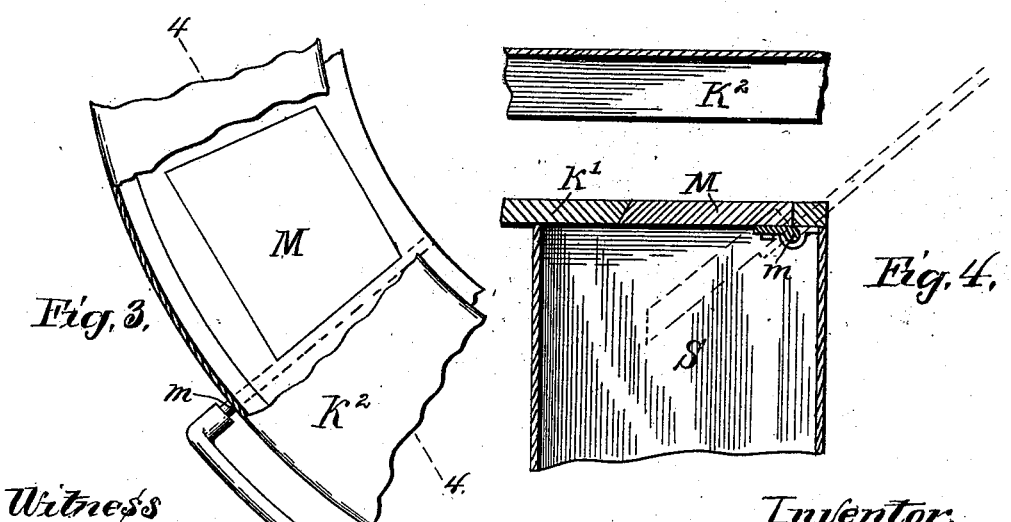
Witness
W. C. Corlies
S. W. Brainard
Inventor:
Charles B. McDonald
By Coburn & Thacher
Attys.

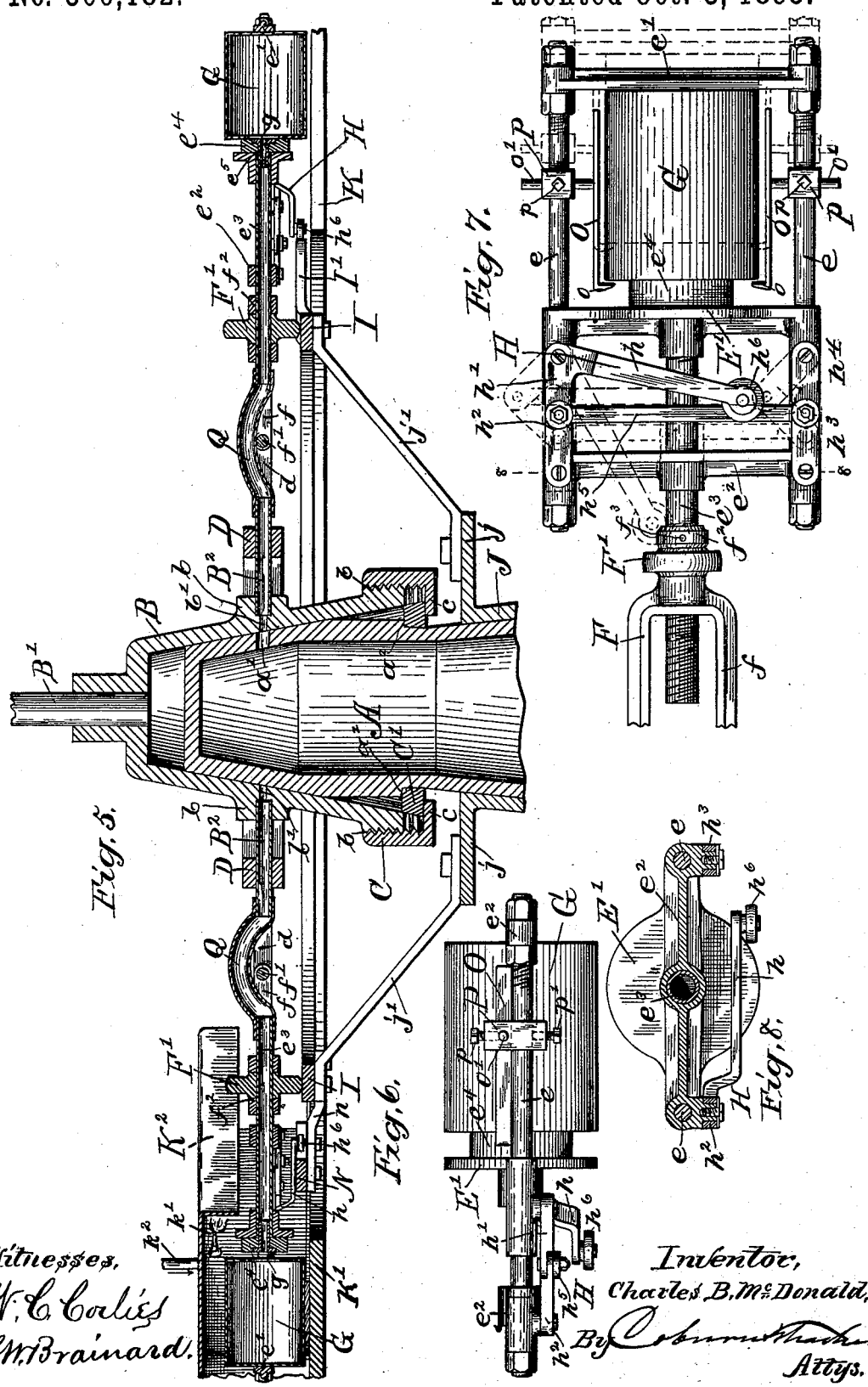

UNITED STATES PATENT OFFICE.

CHARLES B. McDONALD, OF CHICAGO, ILLINOIS, ASSIGNOR OF ONE-HALF TO JONATHAN O. ARMOUR, OF SAME PLACE.

CAN-TESTING MACHINE.

SPECIFICATION forming part of Letters Patent No. 506,182, dated October 3, 1893.

Application filed December 13, 1892. Serial No. 455,050. (No model.)

*To all whom it may concern:*

Be it known that I, CHARLES B. MCDONALD, a citizen of the United States, residing at Chicago, in the county of Cook and State of Illinois, have invented certain new and useful Improvements in Can-Testing Machines, which are fully set forth in the following specification, reference being had to the accompanying drawings, in which—

Figure 1 represents a plan view of a machine embodying my invention, the central cap being slightly broken away; Fig. 2, a vertical section taken on the line 2—2, Fig. 1; Fig. 3, a detail plan of the table showing the device for discharging imperfect cans; Fig. 4, a section of the same taken on the line 4—4, Fig. 3; Fig. 5, a vertical section taken on the line 5—5, Fig. 1, with the base broken away; Fig. 6, a side elevation of a can-holder detached, with a can in place; Fig. 7, a bottom plan view of the same; and Fig. 8, a section of the same taken on the line 8—8, Fig. 7.

In the drawings Figs. 1 and 2 are upon one and the same scale, Fig. 5 upon a scale by itself and enlarged from the former, and the remaining figures upon another and further enlarged scale.

My invention relates to a machine for testing cans, after construction and before using, for the purpose of detecting imperfect cans and separating them from those which are perfect.

The object is to provide a machine operating continuously, so that a can placed in one of a series of traveling holders at a certain point is then carried around, automatically secured in the holder, filled with compressed air, dropped into a reservoir of liquid, raised therefrom, automatically released from the holder, and discharged at one point, or another, according as the test shows the can to be imperfect or perfect, all these several steps being performed during the continuous movement of the can in a circular path, caused by the corresponding travel of the can-holders, which are connected to a revolving support.

I will now describe in detail the construction and operation of a machine in which I have practically embodied my invention in one way; and the improvements which I have invented, and believe to be new, will be more particularly defined in claims following the said description.

In the drawings A represents a hollow post, or standard, which is air-tight, but is provided with an inlet opening $a$ near its base and an outlet opening $a'$ near its top, the latter being somewhat elongated, as seen in Figs. 1 and 2. The extreme upper end of the post is also tapered slightly to provide for the setting and proper bearing of a conical cap B, which is adapted to slip over the head of the standard and turn thereon, being attached to the lower end of a revolving shaft B', which is rotated by any suitable mechanism. Just below the bearing-head of the standard, there is provided a narrow ledge, or shoulder, $a^2$ running around the standard and formed by thickening the latter slightly above this point, as seen in Figs. 2 and 5. On the lower end of the rotating cap there is a short exterior thread $b$ and the cap is fastened on its bearing by a threaded ring C, adapted to be turned on this threaded section, and provided with an inwardly projecting flange $c$; and between this flange and the shoulder on the post is fitted a packing-ring C' of rubber, or any other suitable material, so as to make a perfectly tight joint, which is always kept tight by turning up the ring as wear occurs. A series of small openings $b'$ are made in the side of the cap at regular intervals from each other and form a circular series around the cap in the same horizontal plane, which plane is intended to be coincident with that of the opening $a'$ in the upper part of the standard. Preferably, slight bosses $b^2$ are raised on the exterior of the cap around the said apertures, as seen in Figs. 1 and 2. A short metal tube $B^2$ is fitted into each one of the bosses around the cap, thus connecting with the side apertures in the latter and forming a series of short radial tubes around it. The outer ends of these tubes are inserted in a ring D through which they pass and project a little distance outside thereof. The ring itself is supported by these short tubes, or pipes, which are firmly seated in the revolving cap, and is provided with a series of short arms $d$ projecting outward therefrom in pairs, the members of each pair being parallel with each other and arranged one on each side of the projecting end of one of the tubes, the ring thus forming a kind of spider, which is rotated with the revolving cap. A series of can-holders and carriers E is secured to this ring, one to each pair of these projecting arms on the latter.

The main parts of this device, as a carrier, are as follows: The outer portion is a rectangular frame, composed of side bars $e$ and end bars $e'$, $e^2$ the outer one being preferably adjustable on the side bars, which may be effected by suitable nuts turned on the side bars on each side of the end bar, or by any other suitable devices. A hollow rod $e^3$ is passed through the center of the inner end bar $e^2$, being loosely fitted therein, so that the frame may slide back and forth on the rod. The outer end of this rod is threaded, and a yoke F is turned thereon, and the prongs $f$ thereof are hinged by a suitable pivot bolt $f'$ to a pair of the arms $d$. Obviously, the rotation of the cap and ring, carried thereby, will also drive around these carrier frames in a circular path and, at the same time, the frames may have a vertical swinging movement on their hinges. A friction roller F' is mounted loosely on the rod just inside the yoke and is held in place by a collar $f^2$ fastened to the rod by pins $f^3$, or any other suitable device. A cross-bar, or cross-head E', is fixed on the inner end of the tubular rod $e^3$, and the side bars of the rectangular frame are mounted loosely in each end thereof, so that they may slide back and forth in these bearings. The rod $e^3$ passes through the cross-head, thus providing a passage through the latter, and upon the face of the said cross-head there is mounted a rubber block $e^4$, provided with a tube $e^5$ passing through the block and projecting from one side thereof, whereby the latter is mounted by inserting the projecting end of the tube in the end of the hollow rod, the relative size of the two tubes being adapted to this purpose. The can G is to be placed between this fixed cross-head and the outer end bar of the rectangular frame and, as the latter is allowed a sliding movement, the can is clamped between the said end bar and the cross-head by a suitable movement of the frame inward. The can is arranged with its top, in which is the usual orifice $g$, toward the cross-head and the pressure upon the can being first received by the rubber block, the latter will tightly close this opening, so that when the can is properly clamped in this holder, it will be completely air-tight, if a perfect article. It will also be seen from Fig. 5, that when the can is clamped in the holder there is a communication between the tubular rod $e^5$ and the interior of the can.

The reciprocation of the sliding frame is effected by means of a lever H, which is substantially a right angled, or bell crank, lever, pivoted at its angle to one end of the stationary cross-heads, as seen in Fig. 7. The long arm $h$ of this lever extends inward nearly across the frame, while the short arm $h'$ extends toward the rear, or inner, end of the said frame. A toggle-link $h^2$ is pivoted at one end to the extremity of the short arm $h'$ of the lever, and at its other to one end of the inner end bar of the frame, which slides on the tubular rod.

On the opposite side of the frame there is a pair of toggle-links $h^3$, $h^4$ pivoted respectively to the fixed cross-head and inner end bar of the movable frame and having their other ends hinged together, as usual. It will be seen that a similar toggle is formed on the other side of the frame by the short arm $h'$ of the lever and the single toggle link $h^2$; and a link-bar $h^5$ connects these two toggles. The long arm $h$ of the lever is dropped by a suitable bend, just a little beyond its pivot, so that the main portion of the lever lies in a plane somewhat below that of the pivot, as seen in Fig. 8; and a friction roller $h^6$ is mounted on the outer end of this arm, being located preferably on the under side of the latter, as seen in said Fig. 8. It will be evident that the vibration of this lever will reciprocate the sliding frame to clamp the can in the holder, as already explained, or to release the same, and the means of effecting this movement will now be described.

A track I is mounted just below the plane of the ring D, being in the shape of a narrow strip adapted to form a bearing for the friction rollers F'. This track is composed of three sections—a main portion $i$, which is horizontal and at such a distance below the plane of the ring D that the rollers resting thereon will hold the can-carriers out in a horizontal position; at one side of the machine there is a section $i'$ on a lower horizontal plane and also drawn a little inward, so that it stands in the position a section of the track would take if swung downward on a center coincident with the hinge of the carrier; and sections $i^2$ connect the said upper and lower sections, and so bend downward and inward slightly from the extremities of the upper section $i$, as seen in Fig. 1. This track is supported by a collar J on the upright standard, provided with a horizontal flange $j$ to which are fastened inclined supporting bars $j'$, the outer or upper ends of which are secured to the track, thereby supporting the latter, as seen in Figs. 2 and 5. The rotation of the cap B, and the parts connected therewith, is in the direction of the arrows seen in Fig. 1, and a short table K is arranged at one side of the machine, just a little before the drop in the track I, as seen in said Fig. 1. This table is circular in form and arranged in a plane a little below the track I, and opposite thereto, projecting sufficiently far to rest underneath the outer ends of the carriers, as they are moved along over the said table. A cam I' is provided on the track I extending horizontally outward therefrom about opposite the inner end of the table K. This cam is intended to lie in the path of the roller at the end of the long arm $h$ of the lever H, so that the latter will come in contact with the cam, as seen in Fig. 1, and, as the carrier is moved forward, will be swung inward toward the fixed cross-head of the frame, thereby straightening the toggles and moving the sliding frame inward, whereby the can is clamped in the carrier, as already described, and as shown in full lines in Fig. 7. The relation of the cam and lever is such that the action of the former upon the latter will cease just as the toggles are brought into line, so that the frame is locked in this position and the can will be firmly held in the carrier until the toggles are broken, or unlocked.

A tank L is arranged at the side of the machine opposite the depressed section $i'$ of the track I, this track commencing a little distance from the table K. The tank is just below the level of the depressed section $i'$ of the track and extends just underneath the latter, as seen in Fig. 2, and is filled with water, or other liquid. This track extends around along the entire length of the depressed track section $i'$.

Just beyond the tank is a second table K', the front of which is inclined downward to the tank itself, thus presenting an inclined way $k$ extending upward from the tank to the main portion of the table, which is about on a level with the table K, but does not extend entirely around to meet the latter, a free open space being left between the two, as seen in Fig. 1.

Near the termination of the table K' there is arranged a trap, or drop, door M, which is hinged by a pivot pin $m$ to the table at one end while the other is left free, so as to be turned downward at any time desired, the table itself being cut out at this point to accommodate the swinging of the trap. A lever $m'$ is fastened to the outer end of the pivot pin and extends backward toward the commencement of the table, and at its outer end is provided with a weight $m^2$, which, of course, acts to turn the lever downward and thereby hold up the trap normally in a level position with the table.

After the cans are brought up onto the table K', and before the trap door is reached, they are to be released from the clamp in the carrier. This is effected by means of a cam N, which consists of a narrow strip of metal bent in the required shape and fastened to arms $n$, which in turn, are secured to the track I. This cam is located between the front end of the table K' and the said track I, and in the plane of the travel of the roller on the end of the toggle lever H. At its front end the cam-way extends outward just over the table K' and thence bends inward toward the track I, as seen in Fig. 1. The end of the toggle lever on one of the carriers, as it is brought up and commences to move along the table K', passes inside of this cam-track and is, therefore, forced outward toward the fixed cross-head on the carrier, thereby breaking the toggle joints and sliding the rectangular frame and so releasing the can.

A hood $K^2$ is arranged over the table K', being fastened to the outer edge of the latter and thence extended upward and then inward over the table, as seen in Figs. 1 and 5. Preferably, the space underneath this hood is heated slightly by any suitable means. In the drawings this is shown as a gas burner $k'$ underneath the hood which is supplied by a gas pipe $k^2$ outside of the hood and leading from some suitable gas supply.

A hook O is fastened to each of the side bars $e$ of the rectangular frame of the can-holder. As seen in the drawings these hooks are straight bars, provided with a straight hook, or bend $o$ at one end, and laterally projecting pins $o'$. These pins are mounted in slides P, which in turn are mounted on the respective side bars $e$. The pins pass through the slides and are fastened in the position desired by set-screws $p$ and the slides themselves are secured in any adjustment on the bars by means of set-screws $p'$. These hooks are adjusted in the frame, so that the bent ends extend inward over the can, when it is clamped in position in the carrier, as seen in Fig. 7. The outer extremity of the tubes $B^2$ and the inner ends of the tubular rods $e^3$ are connected by flexible tubes Q of rubber, or any other suitable material. These flexible connections are for the purpose of preserving communication between the two tubes under the vibratory movement of the can-carriers, as they pass over the track I and, preferably, they are arranged to pass over the hinges of the said carriers and are of such length as to provide a little surplus when the carriers are in a horizontal position, as seen in Fig. 5, which permits the vibration of the carriers on the depression of the track I, without danger of breaking the connection by strain on the flexible tubes.

The operation is as follows: Air is forced into the hollow standard through a pipe, or tube, $a^3$ fitted to the inlet opening $a$ therein, and the stationary parts are so arranged that the outlet $a'$ near the top of the standard will stand opposite the open space between the table K and the tank L, just a little in rear of the cam I', as seen in Fig. 1. The cap on the top of the standard being set in motion moves around in the direction of the arrows, Fig. 1, and, of course, carries everything attached thereto with it. An attendant at the front end of the table K places a can within each holder, just as it passes over this end of the table, as seen in Fig. 5. The can is moved along over the table by the holder until the cam I' is reached, when the toggle lever is actuated and the can is clamped in the holder, as already described. Just after the carrier, with its can clamped therein, leaves the table K and the toggle lever leaves the cam I', the tubular connection between the cap and this particular can will be brought to register with the outlet $a'$ in the top of the standard, as seen in Fig. 1, and this outlet being slightly elongated, while the inlet to the tube is comparatively small, the period of register is sufficient for completely filling the can with compressed air, which is shut off from all escape therefrom, as soon as the inlet is cut off from the opening in the standard by the further revolution of the cap. Just after the filling of the can with air the holder carrier reaches the drop in the track I and swings downward on its hinge, the roller following the said track, which depression is sufficient to immerse the can in the liquid bath. If the can is perfect, of course there can be no escape of air and no disturbance of the liquid, but, if the can is imperfect, the compressed air will escape through any opening, however small, and will cause air bubbles, or globules, in the liquid after the can is immersed. An attendant standing at the other end of the bath, where the table K' commences, detects the defective cans from these bubbles. The cans just after being brought up on the table K' are released by the action of the cam N, as already described. The trap door M is located just beyond this cam N, so that the released cans are rolled along the table and over this door and, in case of a defective can, the attendant raises the weighted lever $m'$, thereby turning the door downward and dropping the can through the opening into a suitable bin, or receptacle, S below the table; the weight of the lever will effect the closing of the trap immediately the lever is released. The perfect cans are rolled along the table K', as the carriers sweep over the latter, and drop from the carriers as they pass off from the table into the open space between the two tables, as seen in Fig. 1. Sometimes the cans will stick slightly on the block of rubber which closes the opening, and the hooks O are designed to clear the can when this occurs, for the hooks being attached to the side bars of the sliding frame will, of course, move out with the latter and pull the can away from the stationary block. The cans coming from the bath will be dried as they pass over the table K' beneath the hood K², the air underneath which is heated, as already described. I thus provide a machine for testing cans, which is continuously operative, and by the action of which cans are very rapidly tested and at the same time with absolute certainty. The attendant cannot fail to detect a defective can, if he gives proper attention to his duty.

In details of construction there may be many changes in the apparatus, as shown in the drawings and described above, and some other devices adapted to the purpose may be substituted for the especial means herein set forth, and yet, the machine remain the same in all its essential features of operation, which are, the movement of the cans in a continuous path, the filling of them successively with compressed air, then dropping them in the liquid bath, and then discharging them, the defective at one place and the perfect at another in their continuous path.

Having thus described my invention, what I claim as new, and desire to secure by Letters Patent, is—

1. In a can testing machine, an upright hollow standard, provided with an inlet through which air may be forced into the standard and a single outlet for its escape therefrom, in combination with a revoluble cap mounted on said standard and provided with a series of apertures arranged to register individually and only at a certain point with the single outlet in the standard, a series of can-holders and carriers connected to and moved by said revolving cap, and a tubular connection between each aperture in the cap and the can in the holder corresponding thereto, whereby the can is filled with compressed air while the said two apertures are in register, substantially as described.

2. In a can testing machine, an upright hollow standard supplied with compressed air and having an outlet for the same, in combination with a revoluble cap mounted on said standard and provided with a series of apertures arranged to register successively with said standard outlet, a series of can holders and carriers corresponding to the apertures in said cap and connected to the latter by a hinged joint, a tubular connection between each of the cap apertures and a can in the corresponding carrier, a tank for liquid arranged at one side of the machine, and a track arranged to support the said carriers between their hinges and outer ends and provided with a depression opposite the tank, substantially as described.

3. In a can testing machine, a can holder and carrier, in combination with devices for clamping a can therein, toggle links for opening and closing and locking said devices, a lever for actuating the toggle links, and two cams arranged to move the lever first in one direction and then the other, as it is carried by them, to positively operate the clamping devices both to close and release a can, substantially as described.

4. In a can testing machine, a horizontally revoluble cap, or head, in combination with a series of can-holders and carriers hinged thereto, a horizontal table from which the cans are fed to the machine by placing in the successive holders, as the latter are carried successively over said table a bath tank at one side of the machine nearly opposite said table, and outside thereof and the revoluble head and its standard a second table just beyond said tank, and also outside the latter on which the cans are received from the latter and released from the holders, a continuous supporting track for the holders, having a depression along the said tank, and mechanism whereby the said cans are successively charged with compressed air before reaching the tank, substantially as described.

5. In a can testing machine, a horizontally revoluble cap, or head, in combination with a series of can-holders and carriers hinged thereto, and adapted to swing vertically on their hinge pivots a horizontal table at which the cans are placed successively in said holders, automatic devices whereby the cans are automatically secured within the holders, a bath-tank arranged at one side of the machine outside the standard and revoluble head and beneath the path of the can-holders, a second horizontal table, just beyond and outside said tank, upon which the can-holders are received from the bath, devices for automatically releasing the cans from the holders on such table, and a continuous supporting track for the can-holders depressed along the tank, substantially as described.

6. In a can-holder for testing machines, a tubular supporting and carrying rod $e^3$, and cross-head $E'$ fixed on the outer end thereof, in combination with a rectangular frame $e, e'$, $e^2$, mounted on said rod and cross-head with loose bearings so as to slide thereon, toggle links connecting the fixed cross-head with the sliding frame, and a lever H, by means of which said toggles are operated, substantially as described.

7. In a can testing machine, the tubular rod $e^3$, in combination with the cross-head $E'$ fixed thereon, the sliding frame $e, e', e^2$, the elastic buffer $e^4$ on the cross-head, toggle links $h^2, h^3, h^4$, angle lever H, and connecting bar $h^5$, substantially as described.

8. In a can testing machine, the tubular rod $e^3$ and cross-head $E'$ fixed thereon, in combination with the sliding rectangular frame, the toggles connecting said cross-head and sliding frame, the toggle actuating lever H, and the cam $I'$ arranged to actuate said lever as it passes by to straighten the toggle links and clamp the can in the holder, substantially as described.

9. In a can testing machine, the tubular rod $e^3$ and cross-head $E'$ fixed thereon, in combination with the sliding rectangular frame, the toggles connecting said cross-head and sliding frame, the toggle actuating lever H, and the cam N arranged to actuate the said lever, as it passes along the same, to break the toggles and release the can, substantially as described.

10. In a can testing machine, the revoluble cap B, provided with a series of apertures $b'$, in combination with the tubes $B^2$, the ring D on said tubes, the can-carriers and holders E hinged to the said ring and provided with a tubular rod $e^3$ and a flexible tube Q connecting the respective tubes $B^2$, $e^3$, substantially as described.

11. In a can testing machine, a revoluble cap, or head, in combination with the continuous track I, having a depression $i'$ at one side thereof, can-holders and carriers E having a hinged connection with said cap, on which they swing vertically as a center, rollers $F'$ on the can-carriers adapted to follow said track, and a bath tank arranged outside the standard and revoluble head and along the depressed section of the track only, substantially as described.

12. In a can-holder for testing machines, the fixed cross-head $E'$, in combination with the sliding frame movable on said cross-head, and the retracting hooks O mounted on said frame, substantially as described.

13. In a can testing machine, a series of traveling can-holders and carriers, in combination with a test-bath, in which the cans are immersed, a receiving table to which said cans are brought from the bath, a hood covering and partially surrounding said table, and a heater for warming the air within the said hood to dry the cans, substantially as described.

CHARLES B. McDONALD.

Witnesses:
MINNIE E. SMITH,
S. W. BRAINARD.